May 2, 1950     F. W. LIVERMONT     2,506,091
TORQUE INDICATOR
Filed Nov. 26, 1945
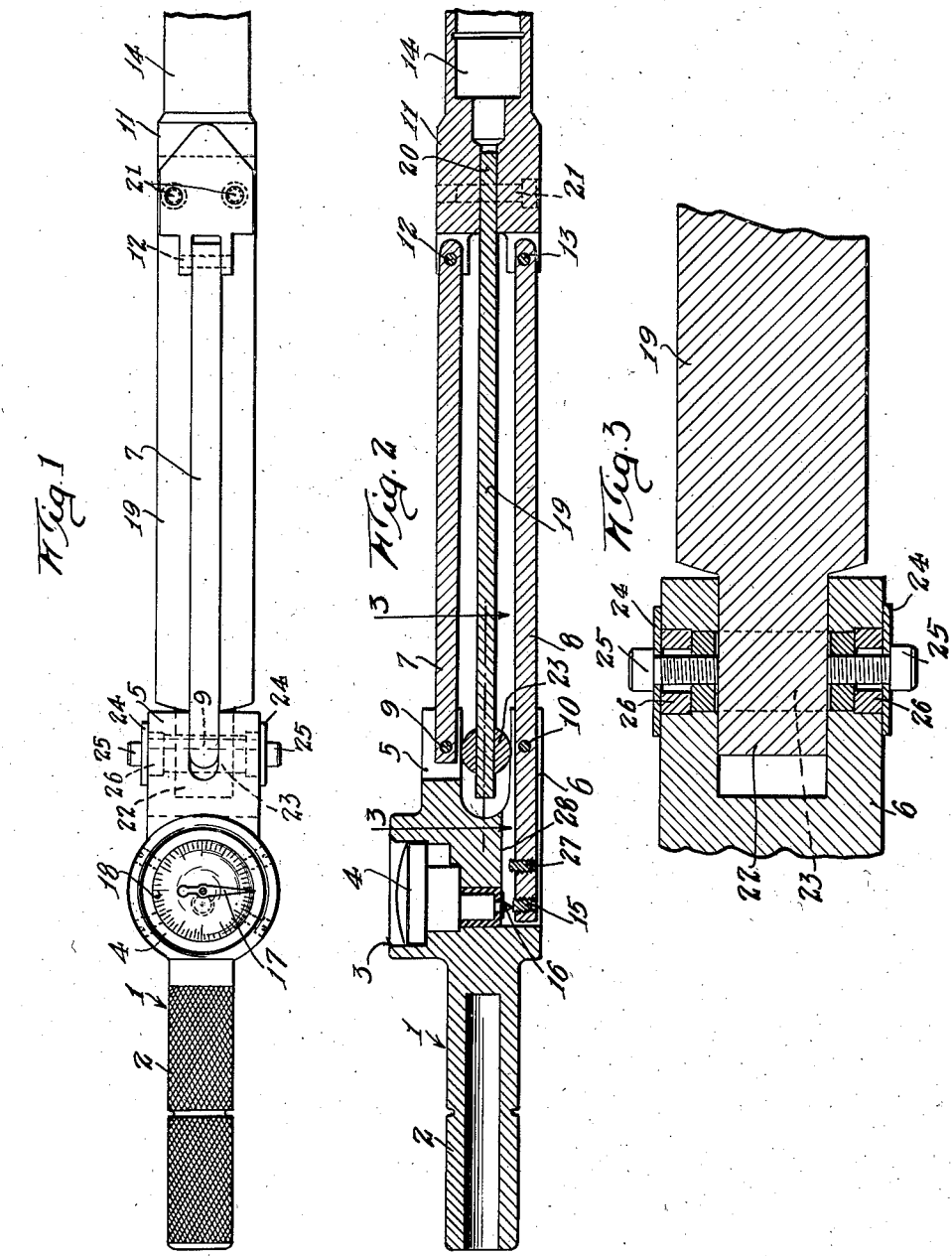
Inventor
Frank W. Livermont
By Lyon & Lyon
Attorneys Patented May 2, 1950

2,506,091

UNITED STATES PATENT OFFICE 2,506,091

TORQUE INDICATOR

Frank W. Livermont, Los Angeles, Calif., assignor to Richmont, Inc., Los Angeles, Calif., a corporation of California Application November 26, 1945, Serial No. 630,773

8 Claims. (Cl. 73—139)

This invention relates to torque indicators and more particularly to the construction of a device for indicating the force applied to rotate a threaded or other similar connection. There are now manufactured and sold many forms of torque wrenches or devices adapted for use in setting up threaded connections to a predetermined torque. Most of these devices are of such character that they will yield through a slip connection to prevent the imposition upon such threaded connection of a torque beyond a predetermined maximum. Particularly in connection with large threaded connections as, for example, the threading of large nuts upon bolts, studs, shafts, or the like, it is desirable to have a means which will give a definite indication of the torque applied to the tightening of such threaded connections. It oftentimes is desirable to have a means which may be used as an extension rod for a wrench socket or the like which is fitted to such nut or threaded connection in carrying out the threading operation.

It is therefore an object of this invention to provide a torque indicating device which will give a direct reading of the torque applied to a threaded connection and which device may serve as an extension rod or handle for use in connection with a wrench, socket or the like in the making up of threaded connections.

Another object of this invention is to provide a simple torque indicating device which includes an indicator carried within a housing handle and connected with a socket through the medium of a pair of parallel bars between which there is imposed a spring bar so that deflection of the spring bar is indicated directly upon the indicator positioned within the housing handle.

Other objects and advantages of this invention it is believed will be apparent from the following detailed description of a preferred embodiment thereof as illustrated in the accompanying drawings.

In the drawings:

Figure 1 is a plan view of the device embodying my invention.

Figure 2 is a side elevation principally in vertical mid-section thereof.

Figure 3 is a sectional view taken substantially on the line 3—3 of Figure 2.

In the preferred embodiment of my invention, illustrated in the accompanying drawings, I indicates a handle housing providing a grip 2, a dial indicator housing 3 in which a direct acting dial indicator 4 is housed. The handle housing is also provided with spaced parallel link ears 5 and 6 within which the connecting links 7 and 8 are positioned and pivotally supported by means of dowels 9 and 10, respectively. Carried at the opposite ends of the links 7 and 8 is a bar socket 11 which is pivotally connected to the links 7 and 8 by means of dowels 12 and 13, respectively. The socket 11 is formed with a socket recess 14 adapted to receive the extension rod or handle of a socket wrench, rod or the like used in rotating a threaded element.

The lower link 8 extends within the housing 1 beyond its supporting pivot or dowel 10 and is provided with an indicator pin engaging set screw 15 which is threaded within the end of the link 8 so as to be adjustable with respect thereto. Its upper surface engages the actuating pin 16 of the dial indicator 4 which is supported within the housing 3. The dial indicator 4 is of the common type and a thrust against the pin 16 rotates the indicator 17 with reference to the graduated dial 18.

Interposed between the links 7 and 8 is a spring leaf 19 which is secured affixed within the socket 11 by having its end 20 fitted closely within a recess formed in the socket and being held by means of cross pins 21. At its opposite end the leaf spring is positioned between the ears 5 and 6 so that it may move longitudinally within the recess provided between the said ears as it is flexed due to the imposition of a force upon the handle or grip 2 resisted by the threading of the threaded member as connected with the socket member 11. This movable connection is provided by passing the reduced end 22 of the leaf spring 19 through a slot formed through a roller 23, the roller 23 being in turn positioned between the ears 5 and 6 so as to ride upon their adjacent surfaces. The roller is held in position upon the end of the leaf spring 19 by any suitable means such, for example, as by utilizing a pair of opposed washers 24 which are of sufficient size to engage the side surfaces of the ears 5 and 6 and through which cap screws 25 are passed and threaded into the opposed ends of the roller 23 to engage the opposite edge surfaces of the reduced section 22 of the leaf spring 19.

Spacing sleeves 26 are positioned between the washers 24 and the ends of the roller 23 to prevent a binding force being exerted by the washers 24 against the side edges of the ears 5 and 6, thereby forming merely a guide without material frictional resistance of the free movement of the roller 23 between the ears 5 and 6.

A stop screw 27 is threaded to the extended end of the link 8 to engage the surface 28 of the indicator housing 1 to limit the pivotal movement of the links 7 and 8 upon their respective pivots and thereby limit the degree of flex of the leaf spring 19.

It will be apparent from the foregoing that when the grip 2 is pulled or pushed by the operator against the wrench or socket connected with the socket member 11 that the force so applied will be directly transmitted through the dial member 4. This direct imposition of this force will be opposed by the leaf spring 19 so that what in effect will be recorded by the dial indicator 4 is the degree of flexing of the spring 19 due to the force applied thereagainst.

The function of the roller 23 is to permit freedom of movement of the spring in the axial direction of the handle element so that the dial indicator 4 may record the force required to flex the leaf spring. As the links 7 and 8 are parallel and are freely pivoted at their opposed ends, they do not impose any material resistance to the bending of the leaf spring 19.

Having fully described my invention, it is to be understood that I do not wish to be limited to the details herein set forth, but my invention is of the full scope of the appended claims.

I claim:

1. In a device of the class described, the combination of an indicator housing having a grip extension, a dial indicator housed within the housing, a socket element, parallel links connecting the socket element and the indicator housing, one of said links being extended to engage the actuating element of the dial indicator within the housing, and a spring leaf connected between the dial indicator housing and the socket element between the parallel links.

2. In a device of the class described, the combination of an indicator housing, an indicator housed within the housing, a socket element, parallel links pivotally connected at their opposed ends with the indicator housing and the socket member, a leaf spring positioned between the parallel links and the operatively connected at its opposed ends with the indicator housing and the socket, and one of said links being extended from its pivotal connection into the housing to engage the operating pin of the dial indicator housed within the housing.

3. In a device of the class described, the combination of a pair of parallel links, a socket pivotally connected to one end of the links, a handle element pivotally connected to the opposed ends of the links, a leaf spring interposed between the parallel links and rigidly connected with the socket element and operatively connected with the handle element, a dial indicator, and means operatively connected between one of the links and the dial indicator for actuating the indicator in accordance with the flexing of the said leaf spring.

4. In a device of the class described, the combination of a pair of parallel links, a socket pivotally connected to one end of the links, a handle element pivotally connected to the opposed ends of the links, a leaf spring interposed between the parallel links and rigidly connected with the socket element and operatively connected with the handle element, a dial indicator, means operatively connected between one of the links and the dial indicator for actuating the indicator in accordance with the flexing of the said leaf spring, and a limit stop means connected with one of the link members to limit the degree of flexing of the leaf spring.

5. In a device of the class described, the combination of a pair of parallel links, a socket pivotally connected to one end of the links, a handle element pivotally connected to the opposed ends of the links, a leaf spring interposed between the parallel links and rigidly connected with the socket element and operatively connected with the handle element, a dial indicator, means operatively connected between one of the links and the dial indicator for actuating the indicator in accordance with the flexing of the said leaf spring, and means for securely affixing the leaf spring to the socket element, and means for securing the leaf spring to the handle element so as to permit freedom of movement in the axial direction of the handle element.

6. In a device of the class described in which the forces exerted on a handle member are transmitted to a socket member and are indicated on a dial indicator, the subcombination comprising, at least one link member pivotally connecting said handle member to said socket member, a spring having its ends supported between said handle member and said socket member and arranged to resiliently resist pivotal movement of said socket member with respect to said handle member, and means operated upon such pivotal movement for actuating said dial indicator.

7. The invention defined in claim 6 characterized by said least one link member comprises a pair of parallel extending link members, and said spring is secured to permit freedom of movement of one of its ends in its axial direction with respect to its corresponding support when said spring is stressed.

8. In a device of the class described in which the forces exerted on a handle member are transmitted to a socket member and are indicated on a dial indicator, the subcombination comprising parallel links connecting the socket member and handle member with one of said links being arranged to engage the actuating element of the dial indicator, and a spring connected between the handle member and socket member arranged to resist pivotal movement of said socket member with respect to said handle member.

FRANK W. LIVERMONT.

REFERENCES CITED

The following references are of record in the file of this patent:

UNITED STATES PATENTS

| Number | Name | Date |
| --- | --- | --- |
| 2,125,945 | Montgomery | Aug. 9, 1938 |
| 2,159,354 | Dunn | May 23, 1939 |
| 2,167,720 | Kress | Aug. 1, 1939 |
| 2,283,888 | Zimmerman | May 19, 1942 |
| 2,340,740 | Fox | Feb. 1, 1944 |